United States Patent [19]

Lee

[11] 4,151,249

[45] Apr. 24, 1979

[54] METHOD OF MAKING A BLOWN BOTTLE WITH INTERNAL RIBS

[75] Inventor: Soo-Il Lee, Toledo, Ohio

[73] Assignee: Owens-Illinois, Inc., Toledo, Ohio

[21] Appl. No.: 866,979

[22] Filed: Jan. 5, 1978

[51] Int. Cl.² .............................................. B29C 17/07
[52] U.S. Cl. .................... 264/520; 264/521; 264/535; 425/526
[58] Field of Search .............. 264/89, 90, 92, 93, 264/94, 96, 97, 98, 99, 327; 425/525, 526

[56] References Cited

U.S. PATENT DOCUMENTS

| | | | |
|---|---|---|---|
| 2,750,625 | 6/1956 | Colombo | 425/539 X |
| 3,125,619 | 3/1964 | Miller | 264/327 X |
| 3,256,564 | 6/1966 | Welshon | 264/327 X |
| 3,775,524 | 11/1973 | Seefluth | 264/97 |
| 3,892,830 | 7/1975 | Hudson et al. | 264/327 X |

FOREIGN PATENT DOCUMENTS

| | | | |
|---|---|---|---|
| 2554281 | 6/1976 | Fed. Rep. of Germany | 264/94 |
| 2606355 | 9/1976 | Fed. Rep. of Germany | 264/94 |

*Primary Examiner*—Jan H. Silbaugh
*Attorney, Agent, or Firm*—Charles S. Lynch; M. E. Click; D. H. Wilson

[57] ABSTRACT

A method of making blown plastic containers having internal ribs is disclosed. The first step of the disclosed method is to prepare a substantially amorphous blowable plastic parison such that a major portion thereof is at a temperature within the orientation temperature range of the plastic, and a strip portion has a higher modulus of elasticity than the major portion. The second step is to blow out the parison within a blow mold such that the major portion expands faster than the stiffer strip portions and interior folded ribs are formed by the strip portions and adjacent areas of the major portion. Various means of performing those steps are also disclosed.

9 Claims, 12 Drawing Figures

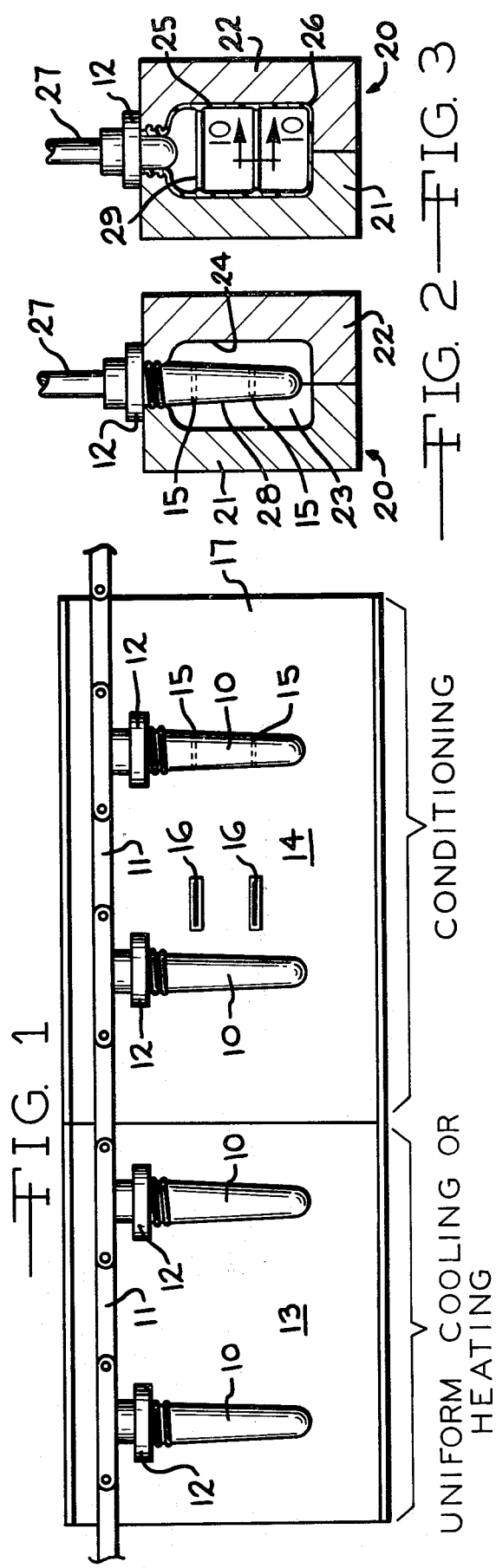

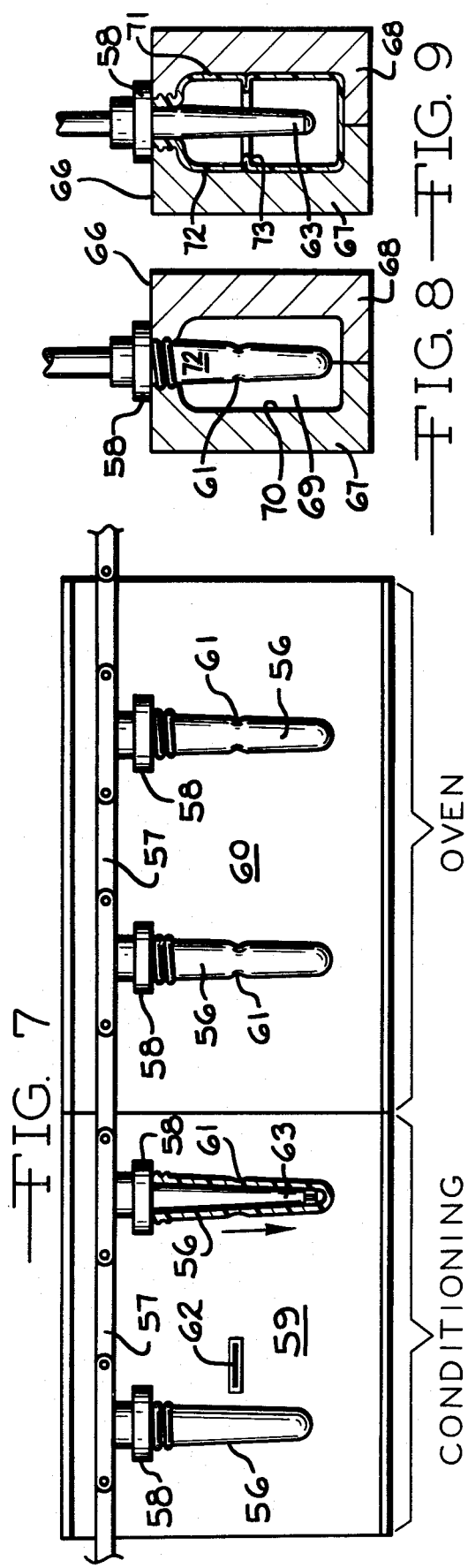
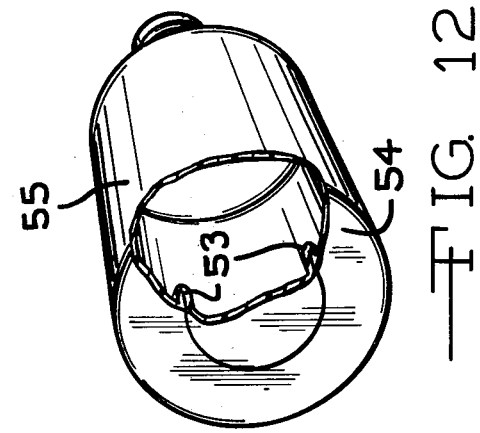
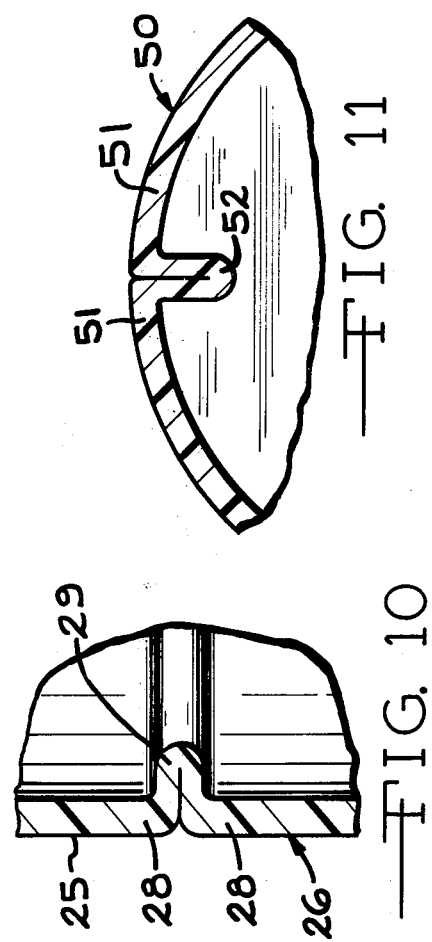

METHOD OF MAKING A BLOWN BOTTLE WITH INTERNAL RIBS

BACKGROUND OF THE INVENTION

The present invention relates to a method of manufacturing blown plastic articles, and more specifically, such articles having internal ribs to reinforce the structure thereof. Traditionally, blown plastic articles are processed in a manner which attempts to optimize strength and integrity of the container by various means of arranging the polymer molecules.

For example, an amorphous thermoplastic parison made of the crystallizable thermoplastics such as polyesters may be mechanically stressed at temperatures between the glass transition temperature and the melting point of the material, and then rapidly cooled, to align the molecular structure and achieve high strength in the direction of molecular orientation. However, if the parison is exposed to such temperatures for a sufficient length of time, crystallization occurs which results in a harder, stiffer material but sacrifices elasticity and clarity. While such sacrifices may be permitted for some containers, most commercial uses require some elasticity to accommodate stresses without brittle fracture, and require clarity for marketing reasons. Therefore, many processes attempt to optimize molecular orientation and minimize crystallization.

In the crystallizable thermoplastics, the rate of crystallization increases rapidly with temperature. Thus, orientation processes are generally limited to stressing the thermoplastic within a narrow temperature range above the glass transition temperature, called the orientation temperature range. Above that range and below the melting point, crystallization occurs rapidly and thus, it is commonly referred to as the crystallization temperature range. As an example, the orientation temperature range of polyethyleneterepthalate (PET), a preferred material for blown plastic bottles, is from 80° C., the glass transition temperature, to 120° C. The crystallization temperature range for PET extends from 120° C. to the actual melting point which generally varies from 220° C. to 260° C. depending upon the degree of crystalline perfection and other variables.

It has been found, however, that oftentimes the highly-oriented, low crystallinity plastic bottles have insufficient structural integrity. Novel methods of achieving an improved balance between rigidity and elasticity are needed, especially in the plastic carbonated beverage bottle industry where the bottles need to be lightweight in order to economically compete with cans and glass bottles, and yet contend with such stresses as internal pressure, stacking loads, compressive stresses caused by capping machines in filling lines, etc.

One earlier approach to the deformation problem of lightweight and/or pressurized plastic containers had been to form reinforcing ribs along or around the external surfaces thereof. However, in order to provide adequate structural aid, the ribs preferably coextended with the surfaces of the container in the direction of the expected load. For example, if heavy vertical loads were anticipated, such as those incurred frequently during warehouse stacking, then the ribs were preferably coextensive with the height of the containers. One primary load of concern with plastic carbonated beverage bottles is the circumferential stress created by the internal pressure and, therefore, such bottles preferably include circumferential support ribs. The above-described rib arrangements, if external, then interfered with the labeling or decorative spaces on the outside of the container. In addition, the prominence of the display of external ribs required them to be designed in an aesthetic manner, thereby oftentimes resulting in waste of material and added weight. The present invention overcomes those disadvantages by providing a method of forming plastic containers having internal reinforcing ribs.

It is known in the prior art to extrude a tubular plastic parison having external reinforcing ribs which are reversed during the blow molding process to provide internal reinforcement to a blown container, as disclosed in U.S. Pat. No. 3,114,932 to Donnelly. The primary drawback of such a method, however, is the use of a special variable extrusion die which is costly because of the required machining and tooling of the die parts.

It is also known in the prior art to pre-blow a parison into a pre-blow mold having concave grooves patterned within its cavity walls, thereby forming an intermediate article with external bulbous ribs, and then final blowing the intermediate article within a blow mold such that the bulbous ribs are inverted to form internal ribs, as disclosed in commonly assigned U.S. Pat. No. 3,956,441 to Uhlig. The primary drawback of this method is that it requires the tooling and machining of a costly pre-blow mold, and decreases the efficiency of the entire blow-molding operation by including a separate pre-blow step.

SUMMARY OF THE INVENTION

The present invention provides a new and useful method for forming plastic containers with internal ribs, and thereby achieving a good balance between elasticity and rigidity, which is not burdened with the high tooling costs of the above-described prior art methods. In its broadest scope, the present method consists of first, preparing an essentially non-crystalline blowable plastic parison such that a major portion thereof is at a temperature within the molecular orientation temperature range of the plastic and such that selected strip portions have a higher modulus of elasticity than the major portion and, second, blowing out the parison within a blow mold such that the major portion expands faster than the stiffer strip portions and interior folded ribs are formed by the strip portions and adjacent areas of the major portion.

The first step of preparing the parison and achieving differences of elastic moduli between the strip and major portions can be accomplished by various means. In one embodiment, the parison is thermally adjusted such that the major portion is at orientation temperature while the strip portions are at a lower temperature. In another embodiment, the strip portions are first selectively crystallized and then the entire parison is brought to orientation temperature. In yet another embodiment, the strip portions are first selectively heated above the glass transition temperature and stretched to cause molecular orientation in those regions, and then the entire parison is brought to orientation temperature which induces crystallization in the pre-oriented strip portions. The crystallization methods offer the further advantage of providing integral internal ribs which are reinforcingly rigid, not only because of greater thickness at the ribs but also because of the additional stiffness properties contributed by the crystalline molecular order.

It is, therefore, an object of the present invention to provide a method for forming plastic containers having reinforcing internal ribs.

It is also an object of the present invention to provide a method for forming internal ribs in plastic containers by means of simple and inexpensive modifications to conventional processes rather than by using expensive, specially tooled molds or extrusion die.

It is further an object of the present invention to provide a method for forming plastic containers having an improved balance between elasticity and rigidity.

Various other objects and advantages of the present invention will be obvious to persons skilled in the art from the following detailed description.

BRIEF DESCRIPTION OF THE DRAWINGS

FIG. 1 is a schematic inside view of an oven and conditioning chamber for preparing a parison such that a major portion thereof is at orientation temperature and minor circumferential strip portions are at a substantially lower temperature in accordance with one preferred method of the present invention;

FIG. 2 is a sectional view of a blow mold enclosing a parison exiting the oven and conditioning chamber in FIG. 1;

FIG. 3 is a sectional view of the blow mold and parison in FIG. 2 after the parison has been expanded to contact the mold walls;

FIG. 4 is a schematic inside view of a conditioning chamber and oven for preparing a parison such that minor axial strip portions are first heated and crystallized and then the entire parison is brought to orientation temperature in accordance with another preferred method of the present invention;

FIG. 5 is a sectional view of a blow mold enclosing a parison exiting the conditioning chamber and oven in FIG. 4;

FIG. 6 is a sectional view of the blow mold and parison in FIG. 5 after the parison has been expanded to contact the mold walls;

FIG. 7 is a schematic inside view of a conditioning chamber and an oven for preparing a parison such that a minor circumferential strip portion is first heated at least to orientation temperature and stretched axially, and then the entire parison is brought to orientation temperature in accordance with a third preferred method of the present invention;

FIG. 8 is a sectional view of a blow mold enclosing a parison exiting from the conditioning chamber and oven in FIG. 7;

FIG. 9 is a sectional view of the blow mold and parison in FIG. 8 after the parison has been expanded into contact with the blow mold walls;

FIG. 10 is a fragmentary sectional view along the line 10—10 in FIG. 3;

FIG. 11 is a fragmentary sectional view along the line 11—11 in FIG. 6; and

FIG. 12 is a partially broken away bottom perspective view of a plastic container including internal bottom ribs constructed in accordance with the method of the present invention.

DETAILED DESCRIPTION OF THE INVENTION

FIGS. 1–3 illustrate one preferred means of performing the present invention method. Blowable parisons 10, pendently mounted from a horizontally traveling conveyor 11 by means of support jaws 12, are shown passing through temperature conditioning chambers 13 and 14, respectively. Preferably, to assure uniform temperature distribution around the circumference of the bottle, the support jaws 12 and, thus the parisons 10, rotate. Such conveyors and support jaws are well-known in the industry and, therefore, will not be described in further detail here.

The parisons 10 are first brought to the orientation temperature range of the thermoplastic in the first chamber 13. The orientation temperature range of thermoplastic is well-known to persons skilled in the art, or is easily obtainable from available data. Since the parisons 10 may be either room temperature preforms, or hot parisons directly from a parison-forming mold station (not shown), the chamber 13 may either heat or cool, respectively, to achieve the necessary temperature adjustment. While the most common means of heating such parisons is by infra-red or forced air, the particular means are not critical to the present invention. Similarly, the most common cooling means is forced air.

The parisons 10 then proceed through the conditioning chamber 14 wherein circumferential strip portions 15 of the parisons 10 are selectively cooled by means of cooling gases horizontally jetted from slots 16 in the chamber walls 17. After being conditioned, the parisons 10 are passed to and enclosed within a blow mold 20 comprised of two sections, 21 and 22, forming a cavity 23 with walls 24 which conform to the exterior 25 of the final blown bottle 26. Compressed air is then fed into the parisons 10 through a blow pin 27 to expand the parisons 10 against the cavity walls 24 of the blow mold 20. Since the strip portions 15 have a higher modulus of elasticity than the remainder 28 of the parison 10 due to their cooler temperatures, those portions 15 do not expand as rapidly. The remainder 28 of the parison 10 then folds around and into those portions 15, forming internal ribs 29, as shown in more detail in FIG. 10. The width and depth of the internal ribs 29 are dependent upon such factors as the degree of cooling of the strip portions 15, the width of the slots 16, the composition and thermal history of the thermoplastic, etc., all of which are easily determined by the artisan to suit the desired purposes.

FIGS. 4–6 illustrate a second preferred means for performing the method of the present invention. Blowable thermoplastic parisons 35, pendently mounted from a horizontally traveling conveyor 36 by means of support jaws 37, are shown being carried through a conditioning chamber 38 and an oven 39. In the conditioning chamber 38, diametrically opposed axial strip portions 40 on the parisons 35 are exposed to a directed heat source 41 to induce crystallization thereof. The parisons 35 are not rotated during exposure of the strip portions 40 to heat. The type of heat source is not critical except that it must be capable of fine calibration to affect the strip portions 40 only. Infra-red, microwave, or even finely controlled impinging flames are suitable sources for that purpose.

The parisons 35 are then actuated to rotate by any suitable means (not shown), and passed through the oven 39 where they are thermally conditioned by heating to the orientation temperature range. Since crystallization is time-dependent, the degree of crystallization of the axial strip portions 40 increases still further in the oven 39.

After being conditioned in the chamber 38 and over 39, the parisons 35 are transferred to and enclosed within a blow mold 45 comprised of two sections, 46 and 47, and having a cavity 48 with walls 49 which correspond to the shape of the final blown bottle 50. Compressed air is then blown into the parison 35 to expand it into contact with the cavity walls 49 of the blow mold 45. Since the crystallized strip portions 40 are stiffer and more resistant to expansion, the remainder 51 of the parison 35 expands first and folds into the strip portions 40 to form internal ribs 52, as shown in FIG. 11.

Although in the latter-described means, the strip portions 40 are first selectively heated to induce crystallization, and then the entire parison 35 is heated up to the orientation temperature range, the reverse of those steps would also be operable. The advantage, however, of conditioning the parisons 35 in the order as above-described is to allow a greater time for crystallization to occur.

While the above-described methods formed circumferential and axial ribs, respectively, it should be appreciated that either method can be modified to form either type of rib, in addition to a large variety of other rib styles.

As an example, both processes may incorporate means for conditioning the bottoms of the parisons to form internal ribs 53 on the bottom 54 of a blown bottle 55, as shown in FIG. 12.

FIGS. 7-9 illustrate a third preferred method of forming circumferential ribs in blown plastic containers. Rotating parisons 56, pendently mounted from a horizontally traveling conveyor 57 by means of support jaws 58, are shown passing through a conditioning chamber 59 and an oven 60. A strip portion 61 on the parisons 56 is selectively heated above the glass transition temperature by means of a heat source 62, as described above, and then axially stretched by an extensible blow core pin 63 to orient the molecular structure in that region. The parisons 56 are then heated in the oven 60 up to the orientation temperature range. Since the rate of crystallization increases with orientation, the stretched circumferential strip portion 61 crystallizes during the heat treatment in the oven 60.

The parisons 56 are then transferred to and enclosed within a blow mold 66 comprised of two sections 67 and 68, and having a cavity 69 with walls 70 corresponding to the shape of the final blown bottle 71. The parison 56 is expanded into contact with the walls 70 of the blow mold 66 by compressed air entering through the blow core pin 63. The major portion 72 of the parison 56 expands faster than the stiffer crystallized circumferential strip portion 61 and folds toward the strip portion 61 to form a reinforcing internal rib 73. The rib 73 is similar in form to the rib 29 on the bottle 26 shown in FIG. 10.

While sufficient detail has been provided herein to enable an artisan to practice the method of the present invention, the invention is not limited to those specific means described. Various modifications should be clear from the above description and may be incorporated without departing from the scope of this invention as defined by the following claims.

What I claim is:

1. A method of making a blown plastic container having at least one internal rib comprising:
   a. preparing a substantially non-crystalline blowable plastic parison having a major portion and at least one strip portion such that said major portion is at a temperature within the orientation temperature range for said parison and said strip portion has a higher modulus of elasticity than said major portion; and
   b. blowing the parison within a blow mold to form said container, said major portion expanding during blowing at a faster rate than said strip portion such that an interior folded rib is formed by said strip portion and adjacent areas of said major portion.

2. A method of making a blown plastic container having at least one internal rib, as defined in claim 1, said parison preparing step including adjusting said major portion to a temperature within the orientation temperature range of said parison and adjusting said strip portion to a lower temperature than said major portion, whereby said strip portion has a higher modulus of elasticity than said major portion.

3. A method of making a blown plastic container having at least one internal rib, as defined in claim 2, said temperature adjusting steps including:
   a. first, heating said parison to a temperature within the orientation temperature range of said parison, and
   b. second, selectively cooling said strip portion only.

4. A method of making a blown plastic container having at least one internal rib, as defined in claim 1, said parison preparing step including selectively inducing crystallization of said strip portion such that said strip portion has a higher modulus of elasticity than said major portion by reason of said crystallization.

5. A method of making a blown plastic container having at least one internal rib, as defined in claim 4, said parison preparing step including:
   a. first, selectively heating said strip portion to a temperature within the crystallization temperature range of said parison for a sufficient time to result in a greater degree of crystallization in said strip portion than in said major portion, and
   b. second, adjusting the entire parison to a temperature within the orientation temperature range of said parison.

6. A method of making a blown plastic container having at least one internal rib, as defined in claim 4, said parison preparing step including:
   a. first, selectively adjusting said strip portion to a temperature above the glass transition temperature of said parison and above the temperature of said major portion, wherein said strip portion is transverse to the axis of the parison,
   b. stretching said strip portions in the axial direction of said parison and thereby orienting same, and
   c. adjusting the entire parison to a temperature within the orientation temperature range of said parison whereby said strip portion incurs a greater degree of crystallinity than said major portion.

7. A method of making a blown plastic container having at least one internal rib comprising:
   a. preparing a blowable plastic parison having a major portion and at least one strip portion such that said major portion is at a temperature above the glass transition temperature and within the orientation temperature range for said parison and said strip portion has a higher modulus of elasticity than said major portion; and
   b. blowing the parison within a blow mold to form said container, said major portion expanding during blowing at a faster rate than said strip portion such that an interior folded rib is formed by said strip portion and adjacent areas of said major portion.

8. A method of making a blown plastic container having at least one internal rib, as defined in claim 7, wherein said parison preparing step includes adjusting said strip portion to a lower temperature than said major portion, whereby said strip portion has a higher modulus of elasticity than said major portion.

9. A method of making a blown plastic container having at least one internal rib, as defined in claim 7, wherein said parison preparing step includes selectively inducing crystallization of said strip portion such that said strip portion has a higher modulus of elasticity than said major portion.

* * * * *